Dec. 9, 1969  H. R. ALBREKTSON ET AL  3,482,364
SPIRAL STAIRCASE

Filed May 2, 1968                                5 Sheets-Sheet 2

INVENTORS
*Helge Ragnar Albrektson &
Charles C. Kreimer*
BY *Melville, Strasser, Foster & Hoffman*
ATTORNEYS Dec. 9, 1969  H. R. ALBREKTSON ET AL  3,482,364
SPIRAL STAIRCASE Filed May 2, 1968  5 Sheets-Sheet 4

INVENTORS
HELGA RAGNAR ALBREKTSON &
CHARLES C. KREIMER
BY MELVILLE, STRASSER, FOSTER & HOFFMAN
ATTORNEYS

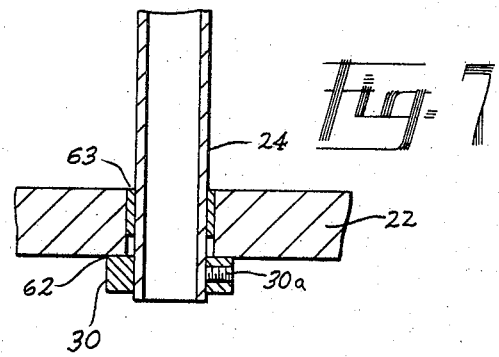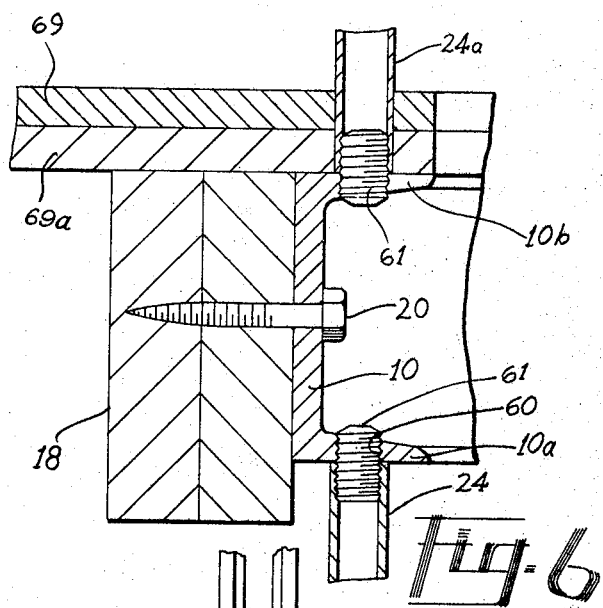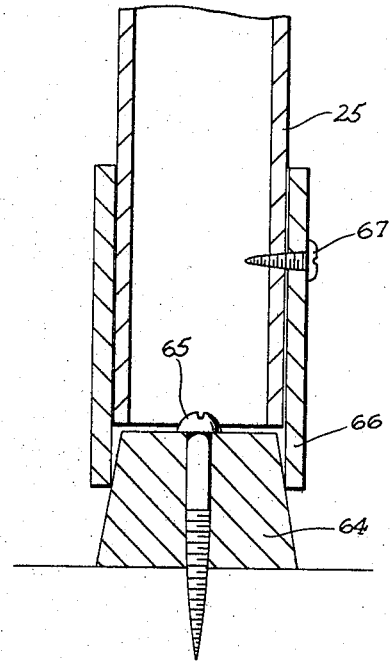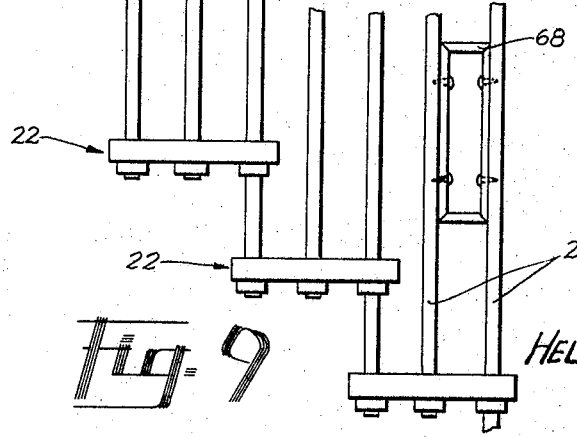

United States Patent Office 3,482,364
Patented Dec. 9, 1969

3,482,364
SPIRAL STAIRCASE
Helge Ragnar Albrektson, Covington, Ky., and Charles C. Kreimer, Cincinnati, Ohio
Continuation-in-part of application Ser. No. 542,908, Apr. 15, 1966. This application May 2, 1968, Ser. No. 727,143
Int. Cl. E04b 1/34; E04f 11/00, 11/02
U.S. Cl. 52—187                                                                15 Claims

ABSTRACT OF THE DISCLOSURE

Suspension supported stairway for use with a supporting structure and including a pair of co-planar, concentric rings secured to the supporting structure, and a plurality of vertical tension members depending from the rings and carrying a plurality of spirally arranged stair treads.

Cross reference to related applications

This application is a continuation-in-part of application Ser. No. 542,908, filed Apr. 15, 1966 in the name of H. Ragnar Albrektson and entitled Spiral Staircase, now abandoned.

Background of the invention

This invention relates to a novel stairway construction, and more particularly to a suspended, spiral or circular (helical) stairway. The invention has great utility in connection with the construction of residential dwellings, but of course, its application is not so limited.

Spiral stairways are believed by many people to have certain advantages. That is, in some cases, the spiral stairway permits a better utilization of available floor space. In addition, the spiral stairway is thought by many people to be more pleasing, aesthetically. However, in spite of these advantages, the inherent construction problems have prevented large scale use of this type stairway, particularly in residential dwellings.

For example, even though many components used in residential construction have become standardized, there is still a possible variation in dimensions, such as floor to ceiling height, which make the development of a prefabricated stairway very difficult.

More importantly, supporting the edges of helically arranged stair treads generally requires a complex supporting structure. Because of its complexity, its cost is also high.

Some workers in the prior art have attempted to eliminate the need for a complex supporting structure by providing a central column to which all of the stair treads are attached. This column is of course in compression, and in some cases requires reinforcement of the floor or lower level at the weight bearing surface. In addition, and unless some further means of support is provided for the outside edge of the stair treads, the resulting structure is not sufficiently stable.

Summary of the invention

Briefly considered, this invention contemplates the utilization of two substantially circular rings which are secured to a suitable supporting framework (the joists or other structural members for the uppermost floor to which the stairway leads) and from which the various stair tread members are suspended. As will become apparent from this specification, all of the supports for the individual stair treads are in tension; and by the same token, there is no supporting member of the stair case which is in compression.

The structural member including the substantially circular rings may be readily prefabricated, thus permitting shipment of staircase components to an ultimate installation point in a knocked down condition, and at the same time, readily permitting installation of the stairway by ordinary workmen.

The design of the suspension members is such that the stair assembly can be supported by any of the conventional construction framing methods used, without any special modifications other than providing support and the correct rough opening.

Similarly, the suspended construction permits variation in the total rise of the staircase, and the individual rise per step, to accommodate variations in the floor to ceiling distance in the building.

The invention also contemplates the provision of a unique fixed connection between the individual stair treads and the supporting tension members for restraining the joint from rotation and increasing the lateral stiffness of the structure, thereby contributing to a rigid suspended stair assembly.

The invention also contemplates the provision of a novel anchor for carrying the horizontal or lateral load of the stairway at the plane of the floor below in the area under the bottom tread, thereby resulting in a rigid suspended stair assembly with the position of the treads restrained from lateral deflection.

It is of course an object of this invention to provide a spiral staircase having the above desirable characteristics, and which is further characterized by an eye-catching, pleasing appearance.

Brief description of the drawing

FIGURE 6 is a fragmentary cross sectional view through the outer ring.

FIGURE 7 is a fragmentary cross sectional view showing one manner of securing the stair treads to the vertical tension members.

FIGURE 8 is a fragmentary cross sectional view showing the floor anchor construction for preventing lateral movement of the stair case.

FIGURE 9 is a fragmentary side elevational view showing a portion of the stairway of FIGURE 1 including a stabilizer panel.

Description of the preferred embodiments

Figure 1:
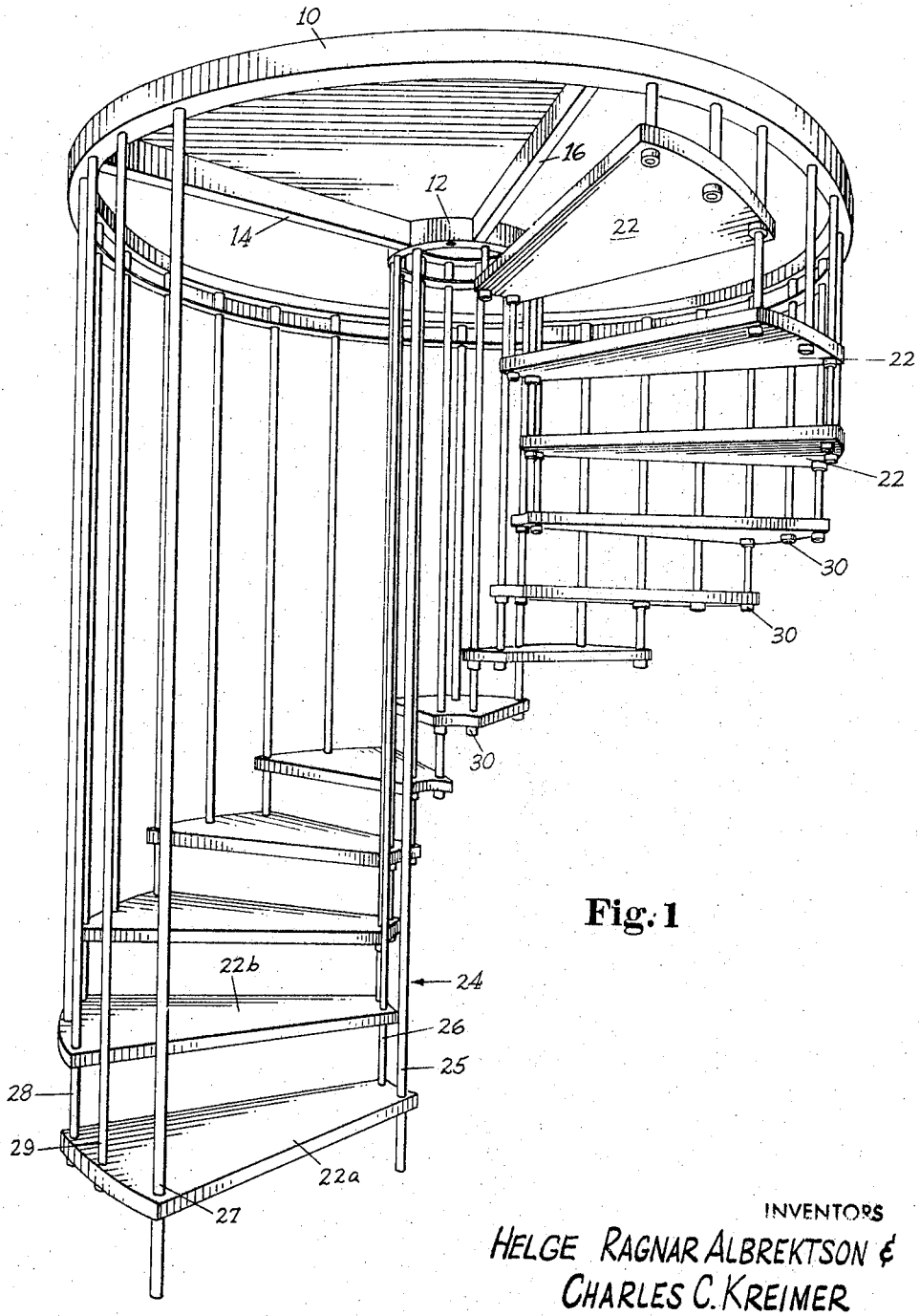
FIGURE 1 is a perspective view of the stairway of this invention.

Referring now to FIGURE 1, which shows the stairway of this invention in perspective as seen from substantially ground level, the stairway includes the outer ring 10 and the inner ring 12. These rings are substantially channel shaped in cross section, and are joined together in concentric, co-planar relationship by the radial structural members 14 and 16. In one form of the invention, the members 14 and 16 are arranged at an angle of substantially 60° to each other, but it will be apparent that the angular relationship will be determined by "outside" factors, such as the available floor space, head room desired, etc.; an angle of about 90° has also proved satisfactory. It may be pointed out in passing that the inner ring 12 and the structural members 14 and 16 define a cantilever structure.

Figure 2:
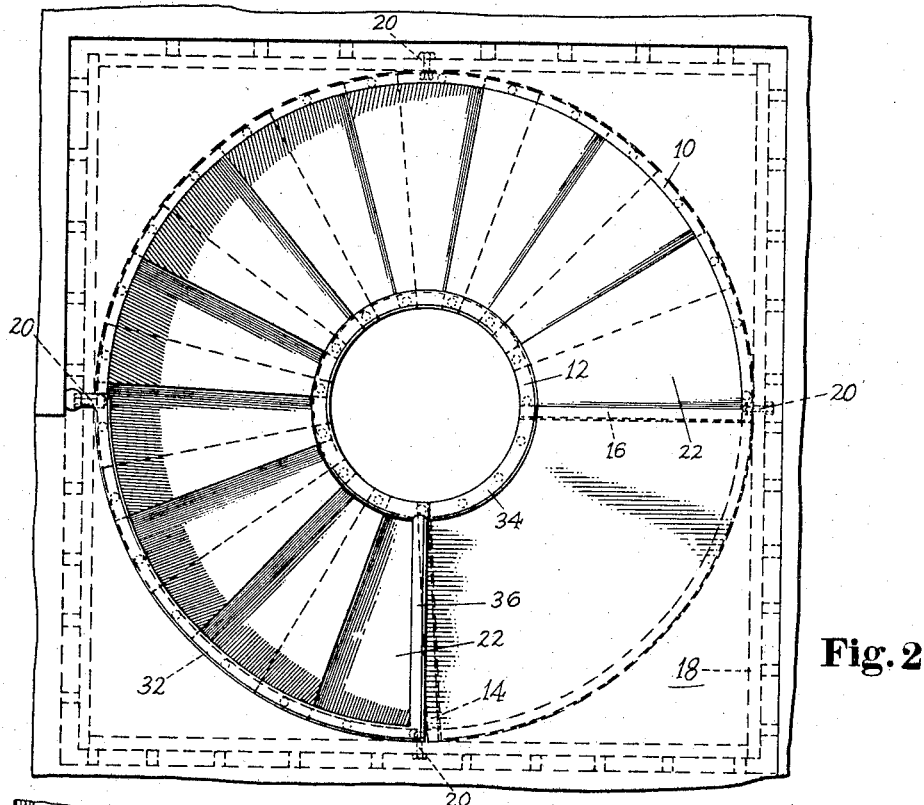
FIGURE 2 is a plan view of the staircase of this invention as seen from the top floor.
Figure 3:
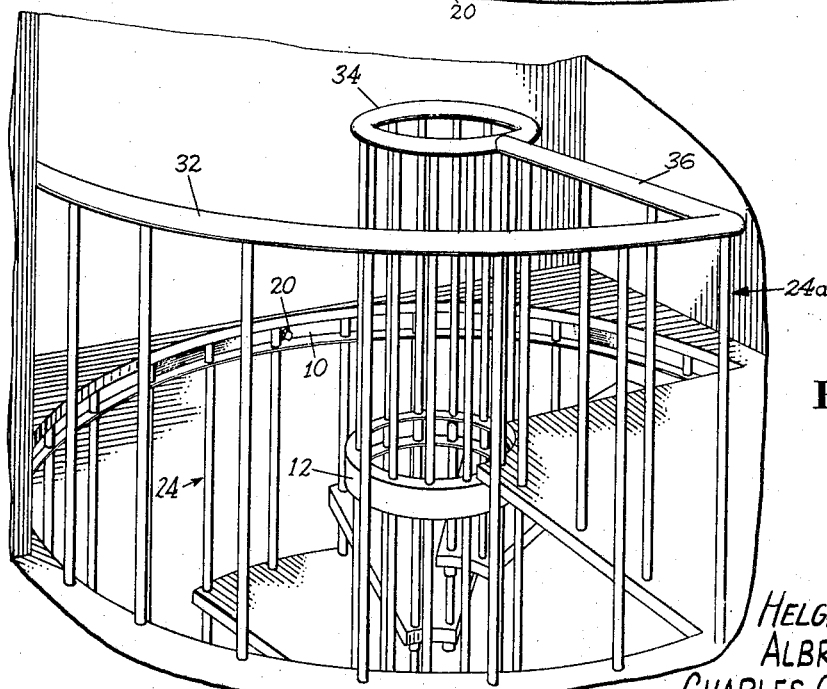
FIGURE 3 is a perspective view showing the top portion of the stairway.

Referring now to FIGURES 2 and 3, it will be seen that the inner and outer rings 10 and 12 respectively, and the radial structural members 14 and 16 are secured to a suitable supporting framework 18. As briefly indicated above, the supporting framework 18 will be the main supports for the floor to which the stairway of this invention leads.

While there are obviously many varied ways of securing these rings to the supporting surface or framework, FIGURES 2 and 6 show the utilization of four anchors (lag screws or bolts) which secure the outer ring 10 to structural members of the building at points where the supporting framework is tangent to the outer ring 10. The floor overlying the radial members 14 and 16 and a portion of the inner ring 12 may be secured thereto by means of ordinary fastening means.

Returning now to FIGURE 1, the spiral stairway of this invention also includes a plurality of stair treads which extend radially about the center axis of the stairway and are arranged to define a helix. Each of the stair treads 22 is in the form of a truncated pie shaped member; and the arc of the outer edge of each stair tread being substantially the same as an arc of the outer ring 10, while the arc at the inner end of the stair tread is substantially equal to an arc of the inner ring 12.

As indicated earlier in this specification, the instant invention contemplates a suspended stairway. To this end, it will be observed that each of the stair treads 22 is suspended from both the inner ring 12 and the outer ring 10 by means of the vertical rods or tubes indicated generally at 24. It will of course be understood that the term rod is used in this application to describe any elongate tension member, including both solid and tubular elements; in practice, tubes have been found preferable.

In the embodiment shown in FIGURES 1–3 each stair tread is supported by five vertical rods. For example, the lowermost stair tread 22a is supported by the rods 25, 26, 27, 28 and 29. It will be noted that four of these five rods (i.e. the rods 25, 27, and 26, 28) are arranged along two radii of the stairway. That is, the rods 25 and 27 both lie on the same radius of the outer circle; similarly the rods 26 and 28 lie on a second radius.

Considering for a moment only the four rods secured to the corners of each stair tread (e.g. the rods 25, 26, 27 and 28) it will be observed that the rods (25, 27) secured to the leading edge of the stair tread 22a pass through and extend beyond the stair tread to the next lower level. By way of example, the rods 26 and 28 pass through the leading edge of the stair tread 22 and extend onto and are secured to the next lower tread 22a. In some cases, the rods 26 and 28 may extend through the tread 22a toward the floor. Similarly, the rods 25 and 27 which extend through the leading edge of the tread 22a extend therethrough toward the floor.

FIGURE 6 is a fragmentary view showing one way in which the vertical rods 24 may be secured to the inner and outer rings. This view shows a portion of the outer ring 10 as secured to the supporting framework 18, by means of the bolt 20. The lower flange 10a of the outer ring is provided with a threaded opening 60. This opening will receive the threaded stud 61 which may be secured in any suitable manner to the upper end of the vertical rod 24. In use, the end of the vertical rod containing the study is screwed into the outer ring until the tubing is tight against the flange. When assembly has been completed, the portion of the stud extending above the top surface of the flange 10a can be staked with a center punch or the like to prevent loosening.

There are numerous ways in which the individual stair treads 22 can be secured to the lower ends of the vertical rods 24. As a general matter, the fit between each rod and the stair tread should be as tight as possible. FIGURE 7 shows in detail one manner of accomplishing this connection which has proved satisfactory. Each stair tread is provided with an opening 62 which is somewhat larger than the diameter of the rod 24. The tight joint is effected by means of the split ring bushing 63 which is in effect wedged between the vertical rod 24 and the walls of hole 62 in the stair tread 22. The collar 30 is secured in place by means of the set screw 30a and serves to locate and support the stair tread at the proper height, and to transfer the vertical load of the stair tread to a tension load in the vertical rod 24.

Assembly of this joint may be effected in the following manner. The split ring bushing 63 is normally of a size to pass readily onto the vertical rod 24. After the split ring bushing has been placed on the vertical rod, the stair tread is placed on the rod and positioned properly by means of the collar 30. When the set screw 30a has been tightened, the split ring bushing 63 is then wedged into the opening 62. The opening 62 is of a size which is substantially the same as the normal outside dimension of the bushing 63, so that wedging the bushing into place by driving it downwardly will effect a very tight joint between the stair tread 22 and the rod 24.

As already indicated, the specific construction taught above has proved satisfactory, but it will be understood that various other joints and connections may be made which will still effect the broad objects of this invention.

It will be recognized by the skilled worker in the art that, in addition to the vertical load carried by a stairway, there is a horizontal or lateral load due to ascending or descending traffic on the stairway. The vertical rods 24 of course carry the vertical load on the stairway. In order to achieve a more rigid stairway, it has been found desirable to provide some further means for restraining lateral deflection of the rods 24. To this end, the floor anchor shown in detail in FIGURE 8 has been found desirable. The anchor includes the tapered anchor block 64 which is secured to the floor by any suitable means such as the fastener 65. The position of the anchor block 64 may be determined by plumbing down from the appropriate openings in the inner and outer rings above, and marking the proper position on the floor. It will be apparent that this position is directly under the ends of the rods 25 and 27.

The floor anchor sleeve 66 is then slipped over the rods 25 and 27 prior to the time they are secured to the inner and outer rings respectively. When these rods are in place, the floor anchor sleeve 66 is extended downwardly as shown in FIGURE 8 until it engages the conical anchor block 64. At this point, it may be securely held in position by means of a suitable fastener 67.

The floor anchor construction just described can be used only in connection with the rods 25 and 27, or if further stability is required, this anchor construction can be utilized in connection with the four rods passing through the corners of the tread 22a. Namely, the rods 25, 26, 27 and 28.

The spiral stairway construction just described is satisfactory for most purposes. However, under some circumstances it may be desirable to provide further rigidity to the structure. In the case of a stairway adjacent an interior wall, the additional stabilization can be accomplished by a simple angle bracket extending from the wall to the bottom of one of the treads 22 which is adjacent thereto.

In the case of a free standing stairway, it may be desirable to utilize the stabilizer panels indicated in FIGURE 9 at 69a. These stabilizer panels are nothing more than rectangular structures of steel or the like secured by screws or other suitable fasteners to two adjacent vertical rods 24.

Referring now to FIGURES 2 and 3, it is in some cases desirable to provide a railing or banister at the uppermost level to which the stairway of this invention leads. In this case, the banister may include a first portion 32 constituted by an arc of a circle of substantially the same diameter as the outer ring 10, a second portion 34 which is a circle of substantially the same diameter as the inner ring, and a third portion 36 which is substantially linear and which extends between one end of the first portion 32 and the second portion 34. It will be observed that all three portions of the banister are co-planar and arranged substantially parallel to the inner and outer rings 12 and 10 respectively. Although the described arrangement is quite desirable, it will be apparent that other arrangements, depending on some extent to the nature of the building, and the location of the staircase therein will be in order.

According to this embodiment, the banister is supported in the position described by the rods 24a which are aligned respectively with the vertical tension rods 24. Obviously, these rods 24a extend upwardly from both the inner ring 12 and the outer ring 10, and are secured at their free ends to the various portions of the banister.

FIGURE 6 clearly shows that the rods 24a are fastened to the upper flange 10b of the outer ring in precisely the same member that the rods 24 are fastened thereto. In this particular figure, it will be seen that the rod 24a passes through the sub-floor 68 and the floor 69 into contact with the top surface of the flange 10b. It will of course be recognized that if desired, the rod 24a could be provided with an elongated stud 61 which would pass through the sub-floor and the floor while the endmost portion of the rod 24a itself would rest on the top surface of the floor 69.

Figure 4:
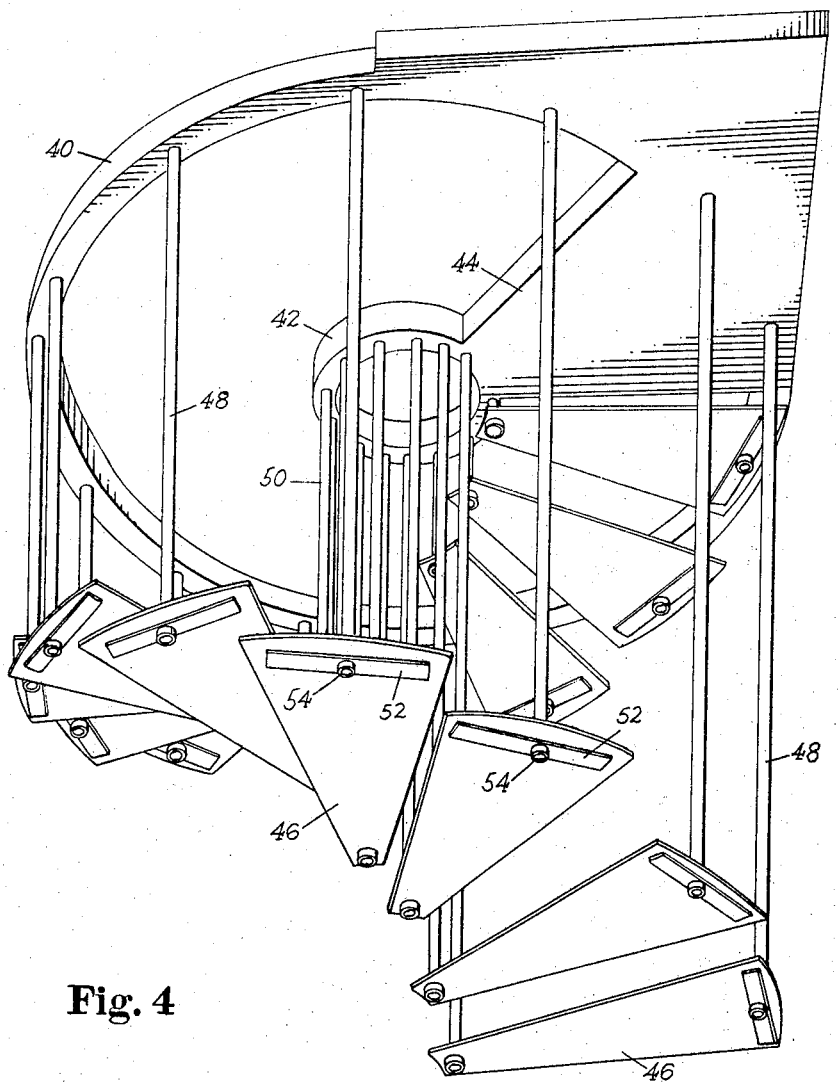
FIGURE 4 is a perspective view similar to FIGURE 1 showing a modification of the invention.

FIGURE 4 shows in perspective a simplified modification of the invention which may be suitable for relatively light duty residential use.

This embodiment includes the outer and inner rings 40 and 42 respectively, which are joined in concentric, planar relationship by the pie shaped structural member 44. These elements are substantially identical to the corresponding elements discussed in connection with the first disclosed embodiment.

In this modification of the invention, each of the individual stair treads 46 is suspended from the inner and outer rings by means of only two vertical rods, 48 and 50, secured respectively to the outer and inner rings.

It will of course be recognized that when only two rods are utilized for each stair tread, it is desirable to provide some means to prevent the individual treads from tipping. In the modification shown, this is accomplished by means of the horizontal fittings 52 which are secured to the under side of each stair tread and are secured to the vertical rod 48 by means of the fitting 54.

Figure 5:
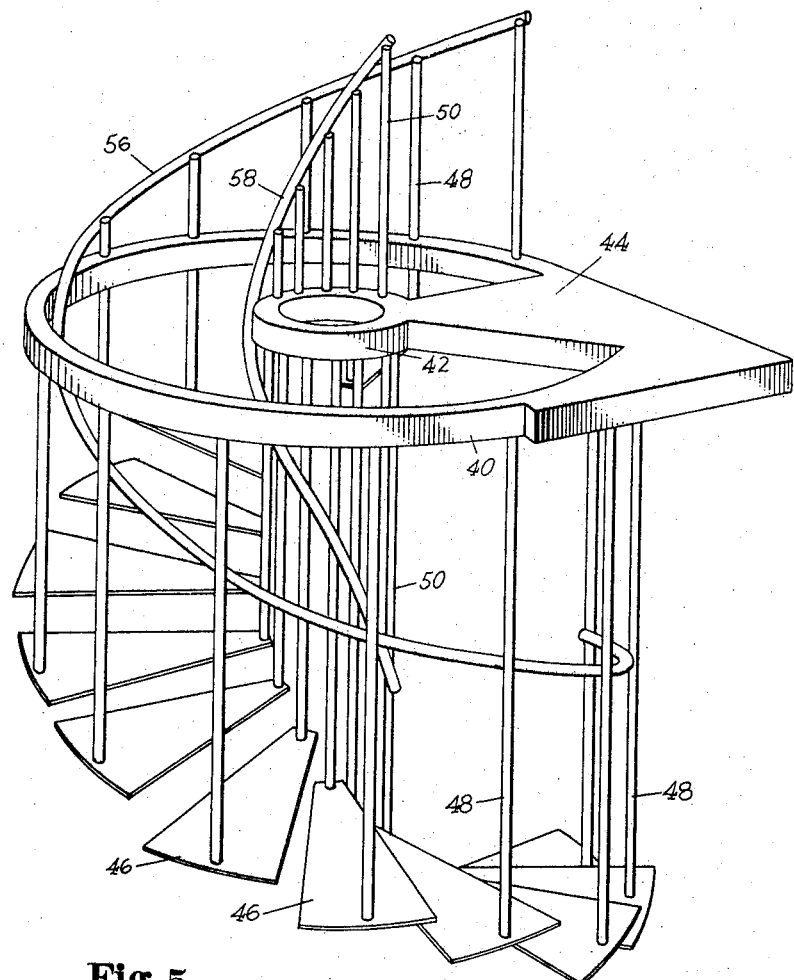
FIGURE 5 is a perspective view showing a further modification of the invention.

FIGURE 5 shows in perspective the stairway of FIGURE 4, with the addition of the spiral handrail or banister on the inner and outer edges of the stairway. By way of comparison with the embodiment shown in FIGURES 1 through 3, the utilization of five vertical rods per stair tread has been found in practice to provide a closely spaced sequence of rods such that a handrail is not at all necessary. In the embodiment of FIGURES 4 and 5, however, the outer vertical rods 48 are spaced relatively far apart, so that it is desirable to have at least the outer handrail or banister 56. It will of course be recognized that the banisters 56 and 58, being secured to the vertical rods 48 and 50 respectively, will significantly add to the strength and rigidity of this modification.

It will be observed that the upward slope of the inner handrail or banister 58 is substantially greater than that of the outer banister 56. A careful consideration of the drawings of FIGURE 5 will disclose that the handrails 56 and 58 will be spaced an equal vertical distance above any given stair tread. With respect to those portions of the handrail disposed above the inner and outer rings 42 and 40 respectively, it will be seen that the rods 48 and 50 respectively extend upwardly by varying distances in order to support their respective handrails in the relationship set out above.

A space saving feature of the spiral (helical) staircase of this invention is that one enters and leaves the staircase in generally the same area, although obviously in different planes. The area of egress is more or less directly below the area of ingress, an arrangement which differs considerably from the more common staircase arrangements heretofore employed. Also, the staircase of this invention does not utilize a center pole or supporting column, thereby further effecting an economy of material and space.

It is believed that the foregoing specification constitutes a full and complete disclosure of several embodiments of the invention. It will of course be understood that numerous modifications and changes other than those set forth may be made in its construction. By way of illustrative example, each of the stair treads 22 can be varied in shape through a wide range. And of course, the composition of the stair treads can be varied to provide novel and decorative effects.

The embodiments of the invention in which an exclusive property or privilege is claimed are defined as follows:

1. A suspension supported spiral stairway for use with a supporting structure, said stairway comprising:
    (a) an outer ring secured to said supporting structure for support thereby;
    (b) an inner ring;
    (c) means securing said inner and said outer rings together with concentric, co-planar relationship;
    (d) a plurality of stair treads extending radially about the center axis of the stairway and arranged to define a spiral;
    (e) at least one depending vertical tension member extending between each said stair tread and said outer ring;
    (f) at least one depending vertical tension member extending between each said stair tread and said inner ring; and
    (g) means for preventing lateral movement of said stair treads.

2. The stairway claimed in claim 1 including a banister, and wherein said banister is supported by vertical members substantially axially aligned with said vertical tension members securing each said stair tread to both said inner and outer rings.

3. The stairway claimed in claim 1 wherein said means securing said inner and outer rings together comprises at least one redial structural member extending therebetween.

4. The stairway claimed in claim 3 including two of said radial structural members arranged at substantially right angles.

5. The stairway claimed in claim 1 including a banister comprising a first portion constituted by an arc of a circle of substantially the same diameter as said outer ring and arranged parallel to and spaced above said outer ring; a second portion constituted by a ring of substantially the same size as said inner ring, said second portion being co-planar with said first portion; a substantially linear third portion extending between one end of said first portion and said second portion; and means supporting said first, second, and third portions above said inner and outer rings respectively.

6. The stairway claimed in claim 5 wherein said means supporting said first, second, and third portions above said inner and outer rings comprises a plurality of vertical rods.

7. The stairway claimed in claim 1 including means to prevent tipping of said stair treads.

8. The stairway claimed in claim 7 wherein said means to prevent tipping of said stair treads comprises at least one vertical rod extending between and secured to each two adjacent stair treads.

9. The stairway claimed in claim 1 including at least two depending vertical tension members extending between each said stair tread and said outer ring.

10. The stairway claimed in claim 1 wherein said means for preventing lateral movement of said stair treads includes an abutment secured to the floor below said stairway, and means securing at least one of said vertical tension members to said abutment.

11. The stairway claimed in claim 10 wherein said securing means comprises a sleeve secured to said vertical tension member and engaging said abutment.

12. The stairway claimed in claim 1 wherein said vertical tension members are threadedly secured to said inner and outer rings respectively.

13. The stairway claimed in claim 1 wherein said vertical tension members are tubular, the upper end of each said vertical tension member including a threaded portion, said threaded portion being engaged in a threaded opening in one of said inner and outer rings.

14. The stairway claimed in claim 1 including a brace member secured to two adjacent vertical tension members.

15. The stairway claimed in claim 1 wherein each said stair tread is provided with an opening to loosely receive each said vertical tension member, and including bushing means adapted to be wedged in said opening around said vertical tension member.

References Cited
UNITED STATES PATENTS
3,013,640  12/1961  Nehrbass _____ 52—187
3,331,467  7/1967  Blum et al. _____ 52—191 X

FOREIGN PATENTS
10,977  1842  France.
808,435  1936  France.

FRANK L. ABBOTT, Primary Examiner

PRICE C. FAW, JR., Assistant Examiner

U.S. Cl. X.R.

52—73